(12) United States Patent
Siino et al.

(10) Patent No.: US 7,325,792 B2
(45) Date of Patent: Feb. 5, 2008

(54) MULTI-AXIAL BASE ISOLATION SYSTEM

(75) Inventors: Michael A. Siino, Orchard Park, NY (US); Brian C. Bucholtz, Lakeview, NY (US)

(73) Assignee: Enidine, Inc., Orchard Park, NY (US)

( * ) Notice: Subject to any disclaimer, the term of this patent is extended or adjusted under 35 U.S.C. 154(b) by 183 days.

(21) Appl. No.: 11/078,099

(22) Filed: Mar. 11, 2005

(65) Prior Publication Data

US 2006/0202398 A1    Sep. 14, 2006

(51) Int. Cl.
   *B60G 11/52* (2006.01)
(52) U.S. Cl. ...................................... 267/33
(58) Field of Classification Search ................. 267/33; 52/167.1, 167.4–167.8
See application file for complete search history.

(56) References Cited

U.S. PATENT DOCUMENTS

| | | | |
|---|---|---|---|
| 1,761,659 A | 6/1930 | Cummings | |
| 2,014,643 A | 9/1935 | Bakker | |
| 2,414,506 A * | 1/1947 | Bowen | 248/568 |
| 3,212,745 A * | 10/1965 | Lode | 248/580 |
| 3,730,463 A * | 5/1973 | Richard | 248/580 |
| 3,771,270 A * | 11/1973 | Byers | 52/167.6 |
| 4,517,778 A * | 5/1985 | Nicolai | 52/167.5 |
| 4,783,038 A | 11/1988 | Gilbert et al. | |
| 4,881,350 A | 11/1989 | Wu | |
| 4,991,366 A * | 2/1991 | Teramura et al. | 52/167.8 |
| 5,277,394 A | 1/1994 | Slemmer | |
| 5,280,889 A | 1/1994 | Amil et al. | |
| 5,368,271 A | 11/1994 | Kiunke et al. | |
| 5,441,243 A | 8/1995 | Loziuk | |
| 5,549,285 A | 8/1996 | Collins | |
| 5,552,585 A | 9/1996 | Fleck et al. | |
| 5,559,671 A | 9/1996 | Dan et al. | |
| 5,599,106 A | 2/1997 | Kemeny | |
| 5,738,330 A | 4/1998 | Folkens et al. | |
| 5,791,636 A | 8/1998 | Loziuk | |
| 5,979,127 A | 11/1999 | Yoneda | |
| 6,000,670 A * | 12/1999 | Okamoto | 248/562 |
| 6,002,588 A | 12/1999 | Vos et al. | |
| 6,079,698 A | 6/2000 | Patterson et al. | |
| 6,120,014 A | 9/2000 | Lee et al. | |
| 6,151,216 A | 11/2000 | Vos et al. | |
| 6,290,217 B1 | 9/2001 | Schneider et al. | |
| 6,299,150 B1 | 10/2001 | Allen et al. | |
| 6,321,492 B1 | 11/2001 | Robinson | |
| 6,378,670 B1 * | 4/2002 | Kawakami et al. | 188/256 |
| 6,406,011 B1 | 6/2002 | Kosar et al. | |
| 6,530,563 B1 | 3/2003 | Miller et al. | |
| 6,536,750 B1 | 3/2003 | Martin | |
| 6,547,205 B2 | 4/2003 | Carter et al. | |
| 6,971,795 B2 * | 12/2005 | Lee et al. | 384/36 |

* cited by examiner

FOREIGN PATENT DOCUMENTS

JP        09089044 A    *    3/1997

*Primary Examiner*—Xuan Lan Nguyen
(74) *Attorney, Agent, or Firm*—Marjama Muldoon Blasiak & Sullivan LLP (57) ABSTRACT

A load isolation system for a component includes at least one isolation assembly. The at least one isolation assembly includes a first mounting plate and a second mounting plate, each of which are parallel to one another and are structurally connected to one another. At least two isolation subsystems are integrated into the isolation assembly in which a first isolation subsystem is disposed between the first mounting plate and an intermediate plate for isolating the component from lateral motions and a second isolation subsystem is disposed between the intermediate plate and the second mounting plate for isolating vertical motions in which the first mounting plate is attached to a fixed support and the second mounting plate is attached to the component.

28 Claims, 4 Drawing Sheets

MULTI-AXIAL BASE ISOLATION SYSTEM

FIELD OF THE INVENTION

This invention relates to the field of base isolation systems, and in particular to a system for isolating multi-axial motion, such as seismic inputs and other events, for use on equipment.

BACKGROUND OF THE INVENTION

Several isolation systems are known in the field, such as those, for example, that are described by U.S. Pat. No. 1,761,659 to Cummings, U.S. Pat. No. 2,014,643 to Bakker, U.S. Pat. No. 4,881,350 to Wu, U.S. Pat. No. 5,599,106 to Kemeny and U.S. Pat. No. 6,321,492 to Robinson. Each of the preceding references describes a system that commonly isolates various motions, using a configuration that includes at least one ball bearing provided within halves of a supporting frame, wherein one half of the frame is securely attached to the foundation of a building, bridge or other structure and the remaining half is securely attached to the structure. These described systems are used in order to provide horizontal or lateral isolation, primarily for seismic events, in order to "earthquake-proof" the particular structure.

U.S. Pat. No. 5,979,127 to Yoneda describes a similar technique for earthquake-proofing objects which may include, for example, non-structural equipment. In the latter system, one or more such devices are provided that are each secured to the bottom of an object and secured thereto. The object is then placed on a flat floor or surface. Vertically applied seismic motions are transmitted by the herein described system to the structure, but horizontal motions of the floor are absorbed through movement of the ball(s) in a curved track provided between the halves of the frame, in order to provide suitable isolation thereof.

Though the preceding references provide a single form of isolation, Applicant is currently unaware of any available system that provides multi-axial (i.e., horizontal and vertical) isolation systems or assemblies in order to properly protect, for example, non-structural equipment. In addition, none of the preceding patents, or any known prior art as presently understood by Applicants, appear to address issues, such as those relating to horizontal friction and/or overtravel limitations using such isolation apparatus, for proper field application of such components or for preventing sand, dirt, and other contaminants from potentially degrading such apparatus.

SUMMARY OF THE INVENTION

It is therefore a primary object of the present invention to overcome the above-noted deficiencies of the prior art.

It is another primary object of the present invention to provide a multi-axial motion isolation system, for use with structural or non-structural components.

It is yet another primary object of the present invention to provide a technique and related apparatus for isolating horizontal and vertical motions, such as those occurring in seismic events, from at least one component wherein the isolation is performed using a single integrated assembly.

Therefore and according to a preferred aspect of the present invention, there is provided a system for isolating motion from components, the isolating system comprising at least one isolation assembly including:

a first mounting plate;

a second mounting plate disposed in parallel relation to the first mounting plate and structurally connected thereto, said first and second mounting plate being fixedly secured to a component;

a first isolation subsystem disposed between said first mounting plate and an intermediate plate disposed between said first mounting plate and said second mounting plate for permitting lateral isolation of motions imparted to said component; and a second isolation subsystem provided between said intermediate plate and said second mounting plate for providing vertical isolation relative to said component.

According to one version of the present invention, the first isolation subsystem includes a plurality of ball and cone isolators that are disposed between the first mounting plate and the intermediate plate. According to this version, three (3) ball and cone isolation assemblies are provided on respective end corners, the assemblies being sandwiched between the first mounting plate and the intermediate plate.

According to one version of the invention, the first isolation subsystem further includes at least one friction producing device which is attached to the intermediate plate. The friction producing device includes a loaded body element and a friction member which is attached thereto. The friction device is disposed within an annular ring element that additionally provides over-travel protection in order to prevent the isolation assembly from being overshifted laterally upon application of motions. The ring element can further include a brush guard component to prevent materials, such as dirt, dust, sand and the like, from contaminating the interior of the isolation assembly.

The second isolation subsystem according to a version of the present invention includes a plurality of vertical isolators, such as wire rope isolators, that are disposed between the intermediate plate and the second mounting plate. Preferably, each of the wire rope isolators are axially aligned with the ball and cone isolators of the first isolation subsystem in order to effectively integrate the two isolation subsystems.

Additionally, the second isolation subsystem can further include an elastomeric pad provided at the top of the friction member which is disposed at the center of the isolation assembly. The elastomeric pad is disposed between the friction member and the second mounting plate in order to assume at least a portion of the vertical loads that are imparted to the component wherein the elastomeric pad and the wire rope isolators combine to form a bi-modal spring-like element that dampens and isolates vertically applied loads or motions imparted to the assembly. The wire rope isolators are compressed during the assembly of the second mounting plate to the intermediate plate in order to provide a requisite stiffness, the amount of compression depending on the application of the herein described assembly.

According to one aspect of the present invention, a plurality of the above-noted isolation assemblies can be provided and secured to the bottom of a component and a fixed support, respectively, to provide multi-axial isolation as part of an overall system. According to one described version, four (4) isolation assemblies can be used in a distributed manner in order to effectively support and isolate a component.

According to another aspect of the present invention, there is provided a method for isolating a component from multi-axially applied loads or motions, said method comprising the steps of:

isolating the component from laterally applied loads or motions; and isolating the component from vertically applied loads or motions wherein each of said isolating steps are performed using a single isolation assembly by fixedly attaching structurally interconnected parallel first and second mounting plates of said isolation assembly to the component, wherein the lateral isolation step is performed using a first isolation subsystem and said vertical isolation step is performed using at least one second isolation subsystem, each of the isolation subsystems being integrated within said single isolation assembly.

An advantage of the present invention is that both lateral and vertically applied loads or motions can be accounted for in terms of isolation with regard to components in a single integrated apparatus.

These and other objects, features and advantages will become readily apparent from the following Detailed Description which should be read in conjunction with the accompanying drawings.

DETAILED DESCRIPTION

The following description relates to a multi-axial isolation system that is made in accordance with a preferred embodiment of the present invention for use with a specific component. It will be readily apparent from the following discussion, however, that many variations and modifications are possible to one of sufficient skill in the field within the intended scope of the present invention. In addition, several terms are used throughout the course of discussion such as, for example "top", "bottom", "above", "below", "upper", "lower", and the like in order to provide a convenient frame of reference with regard to the accompanying drawings. It is not intended, however, unless specifically indicated otherwise, that these terms are intended to be overly limiting of the present invention.

Figure 1:
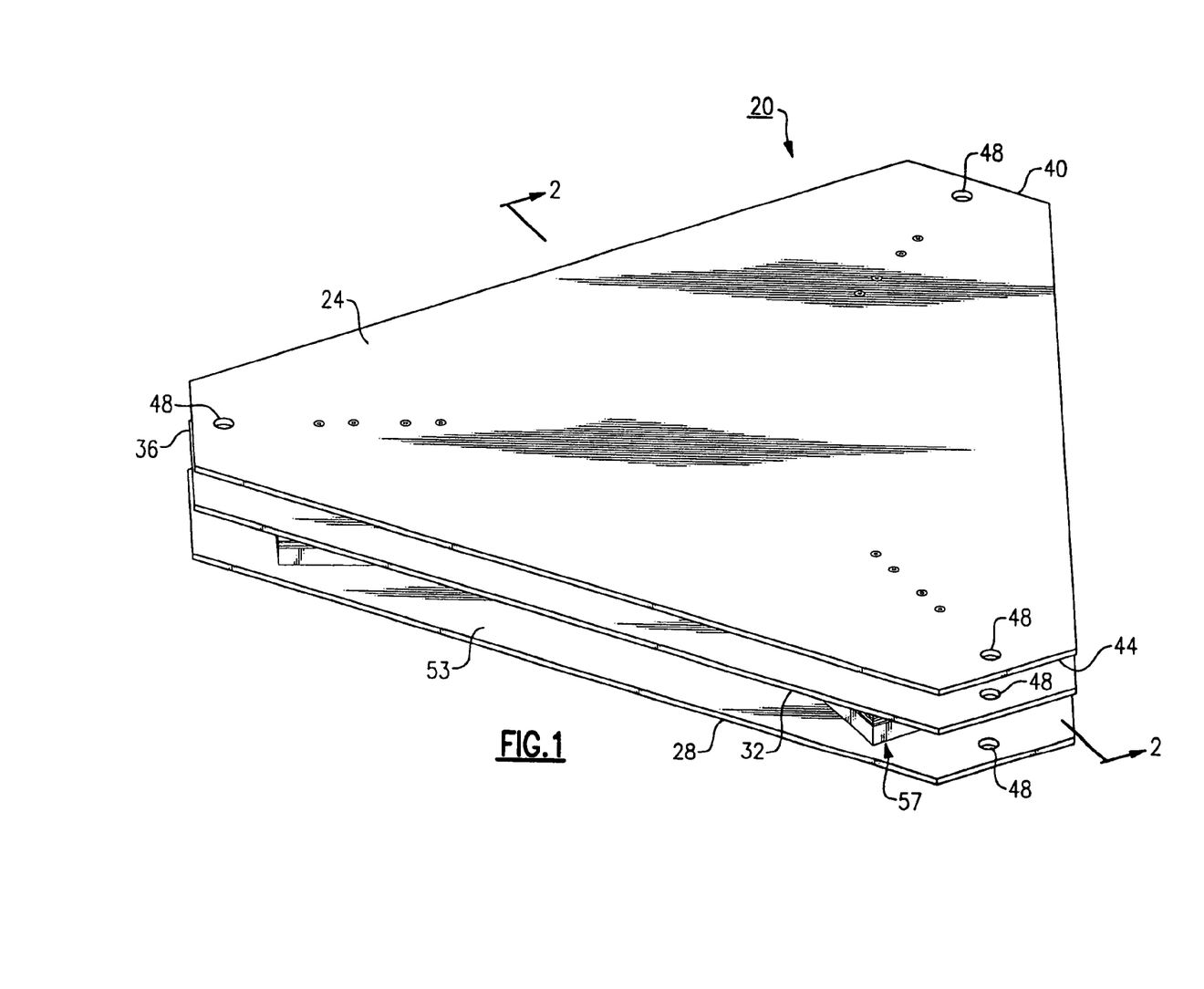
FIG. 1 is a top perspective view of a multi-axial isolation assembly made in accordance with a preferred embodiment of the present invention.

Referring to FIG. 1, the multi-axial isolation system in accordance with this specific embodiment of the invention is shown in a top perspective view thereof. The system, generally referred to by reference numeral 10, FIG. 4, throughout, is defined by a plurality of multi-axial isolation assemblies 20, only one of which is shown in FIGS. 1-3 for purposes of clarity.

The multi-axial isolation assembly 20 according to this embodiment is defined by three (3) parallel plates having various isolating elements that are sandwiched therebetween, as described in greater detail below. More particularly, the herein described multi-axial isolation assembly 20 includes a top mounting plate 24, a bottom mounting plate 28, and an intermediate plate 32 that is disposed between the top mounting plate and bottom mounting plate. Each of the above-noted plates 24, 28, 32, according to this embodiment, is substantially identical in terms of size and thickness and is defined by a substantially triangular configuration that includes respective truncated end corners 36, 40, 44.

According to the present embodiment, each of the mounting plates 24, 28, 32 are manufactured from steel, though other suitable structural materials can be used, the plates each being approximately 0.375 inches thick and having a width of 44 inches, though it should be readily apparent to one of sufficient skill that these dimensions can easily be varied, depending on the application. Moreover, each of the plates 24, 28, 32 further include a through opening 48 which is centered in each of the truncated end corners 36, 40, 44, the openings 48 used to attach the top and bottom mounting plates separately to a component to be isolated, as described below. According to this embodiment, the openings 48 are aligned axially to permit the passage of lifting members, such as eyebolts or the like (not shown), in order to enable transport of the herein described isolation assembly 20. It should be noted for clarity, that only one of the openings 48 in end corners 36, 40 is shown in FIG. 1.

Referring to FIG. 2 and FIGS. 3(a)-3(f), the component parts of the multi-axial isolation assembly 20 are now described in greater detail. FIGS. 3(a)-3(f) illustrate a sequence of perspective views of a single isolation assembly 20, depicting an assembly process. For the sake of clarity, this sequence will be followed for purposes of the following discussion.

Figure 2:
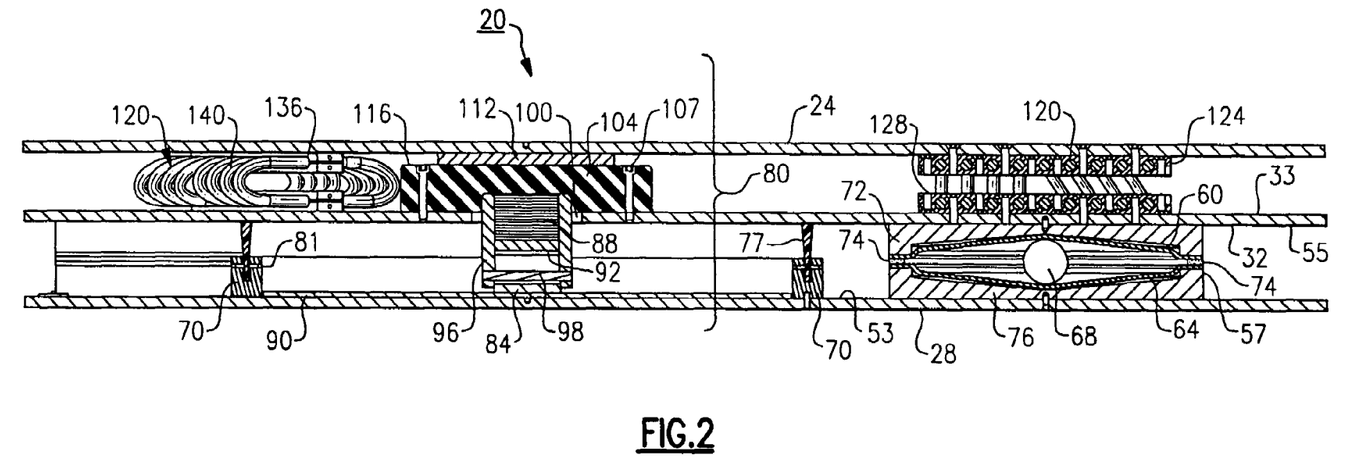
FIG. 2 is a sectioned view of the multi-axial isolation assembly of FIG. 1, taken through lines 2-2 of FIG. 1.
Figure 3A:
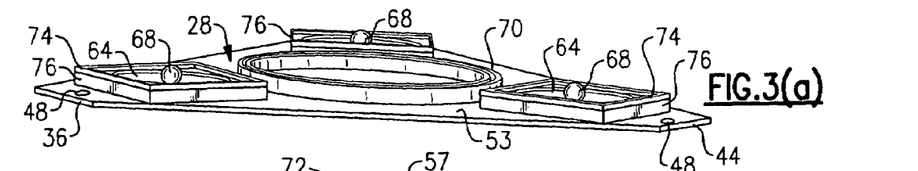
FIGS. 3(a)-3(f) each represent front perspective assembly views, taken in sequence, of the multi-axial isolation assembly of FIGS. 1 and 2.

Referring to FIGS. 2 and 3(a), the bottom mounting plate 28 includes a top facing surface or side 53 that supports a first isolation subsystem that includes, according to this embodiment, three (3) ball and cone isolators 57, each of the isolators being disposed in a respective end corner 36, 40, 44, located just inward of the opening 48. The number of isolators can be suitably varied depending, for example, on the shape of the mounting plates, the size of the mounting plates, and other factors.

Each of the ball and cone isolators 57 is defined by an upper substantially concave dish 60 (shown only in FIG. 2), a lower substantially concave dish 64 and a hardened steel ball 68 that is disposed between the upper and lower concave dishes. The substantially concave dishes 60, 64, which are made from stainless steel according to this embodiment, are fixedly mounted by conventional means, such as screws or other suitable types of fasteners to the upper and lower frame portions 72, 76. Each of the open frame portions 72, 76 are fixedly mounted, such as by welding same to the top facing surface 53 of the bottom mounting plate 28 and a bottom facing surface 55 of the intermediate mounting plate 32, respectively. Disposed between the open frame portions 72, 76 is a foam seal 74, which forms an annular barrier to prevent contaminants such as sand, dirt, and dust from entering each of the ball and cone isolators 57 when in the reset position. An example of such an isolator is described in U.S. Pat. No. 5,599,106 to Kemeny et al., the entire contents of which are incorporated by reference. It will be appreciated that other suitable designs, however, can be utilized to achieve a similar effect and therefore the first isolator subsystem should not be limited to the design taught by the '106 patent.

Figure 3B:
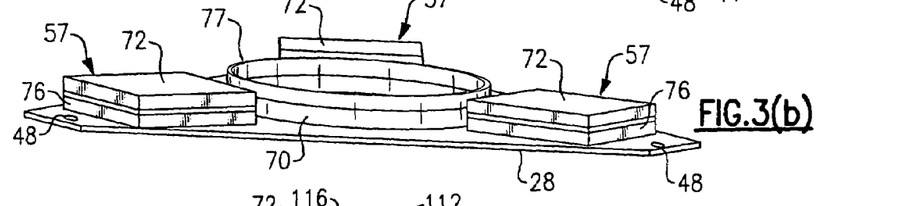

As shown more clearly in FIG. 3(a), an annular over travel ring 70 is also welded to the top facing side 53 of the bottom mounting plate 28, the over travel ring being defined as a substantially thin circular member made from steel, or other suitable material and having a flexible annular brush component 77, FIG. 3(b), attached to the top thereof in a slot formed in the ring using at least one spring pin 81, shown only in FIG. 2. The over-travel ring 70 is mounted such that the center of the ring is coaxial with the center of the bottom mounting plate 28. A thin disc-shaped friction plate 90 made from stainless steel or other structural material is bonded to the top facing side of the bottom mounting plate 28, and is sized to fit within the periphery of the over-travel ring 70.

Figure 3C:
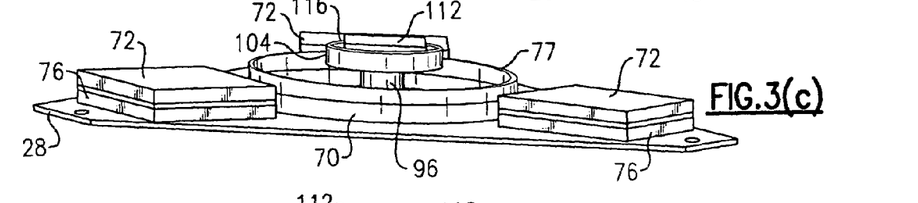

Still referring to FIG. 2 and FIG. 3(c) and prior to mounting the intermediate plate 32 to the assembly 20, a lateral or horizontal friction device 80 is mounted to the top facing side 33 of the intermediate plate 32 in the center thereof and at the center of the over travel ring 70. The friction device 80, according to this embodiment, includes a housing 96 that retains or houses a stacked plurality of disc springs 88 which provide a predetermined load, the springs being disposed in a defined upper compartment 92 of the housing 96. A piston 84 is slidably mounted to the housing 96 by means of a dowel pin 98 or other suitable means through provided openings in the housing 96 and the piston 84. The piston 84, being loaded from the disc springs 88, slides against the friction plate 90, creating a frictional force when horizontal movement between the bottom mounting plate 28 and intermediate plate 32 occurs.

Figures 3D, 3E:
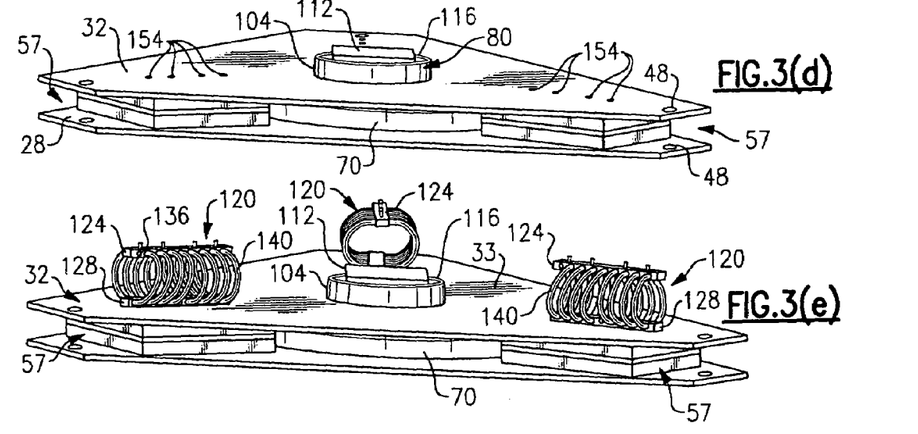

According to this embodiment and referring to FIG. 2 and FIG. 3(d), the housing 96 extends upwardly through an opening 100 that is provided in the center of the intermediate plate 32 when the intermediate plate is attached to the isolation assembly 20.

Mounted over the top of the housing 96 is a mounting base 104, made from steel or other suitable material, that is secured to the top facing surface 33 of the intermediate plate 32 by means of fasteners 107, such as cap screws or the like. An elastomeric pad 112 is disposed onto a top surface 116 of the mounting base 104, the pad covering substantially the entirety thereof. The elastomeric pad 112 is bonded to the top surface of the mounting base 104. According to this embodiment, the elastomeric pad 112 is made from silicone to provide stiffness characteristics as described below, though this component can be made from other materials.

As is clearly seen in FIG. 2, the open frame portions 72, 76 of each of the ball and cone isolators 57 define the spacing between the bottom mounting plate 28 and the intermediate plate 32 wherein the brush guard component 77 forms an annular barrier to prevent contaminants, such as sand, dirt, dust and the like, from entering the periphery of the over-travel ring 70 and contaminating the friction plate 90.

Referring to FIG. 2 and FIG. 3(d), and upon assembly of the intermediate plate 32, the mounting base 104 extends above the top facing surface 33 thereof with the ball and cone isolators 57 being sandwiched by the intermediate plate 32 and the bottom mounting plate 28, as well as the over-travel ring 70 and the brush guard 77.

Referring to FIG. 2 and FIG. 3(e), a second isolation subsystem is provided between the intermediate plate 32 and the top mounting plate 24. According to this specific embodiment, the second isolation subsystem includes a plurality of vertical isolators, such as wire rope isolators 120, each of which are suitably interposed by attachment to the top facing surface 33 of the intermediate plate 32 on each end corner 36, 40, 44 thereof. According to this specific embodiment, three wire rope isolators are employed, each of which are axially positioned directly above the ball and cone isolators 57 so as to be vertically aligned therewith.

Still referring to FIGS. 2 and 3(e), each of the wire rope isolators 120, according to this embodiment, include a rectangular shaped upper mounting block 124 and a parallel correspondingly shaped lower mounting block 128, respectively. A plurality of cylindrical wire coils 140 are introduced therebetween through a series of lateral holes 136 provided in each of the mounting plates 124, 128, as threaded therethrough. The size of the mounting blocks 124, 128 and the lateral holes of the isolators 120, as well as the thickness of the wire used can be suitably varied depending on the load and required damping characteristics of a particular application. One suitable wire rope isolator design which can be used for this purpose is described in commonly owned U.S. Pat. No. 5,549,285 to Collins, the entire contents of which are herein incorporated by reference, though it will be readily apparent from the following discussion that other suitable vertical isolator assemblies can be used or substituted.

Each of the mounting blocks 124, 128 of the wire rope isolators 120 further include openings that are provided on opposing facing sides thereof to permit attachment to the bottom facing side of the top mounting plate 24 and the top facing side 33 of the intermediate plate 32, respectively, each of the latter mounting plates having a series of mounting holes 150, 154 for receiving the fasteners. The mounting holes 150, 154 are aligned with one another such that the wire coils of the isolators 120, when secured, are arranged axially so as to intersect at the center of the isolation assembly 20.

Figure 3F:
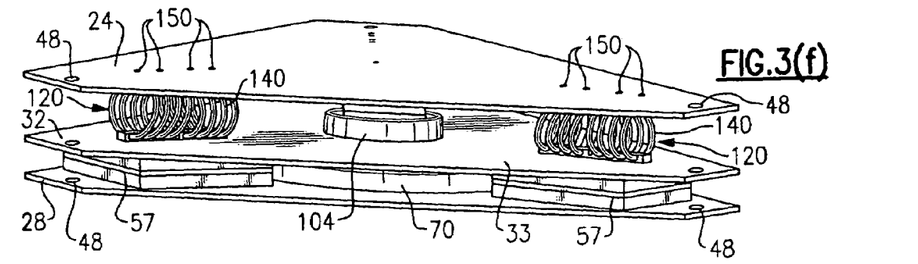

Referring to FIG. 2 and FIG. 3(f), and upon assembly of the top mounting plate 24, the elastomeric pad 112 which substantially covers the top surface 116 of the mounting base 104 is brought into contact with the lower facing surface of the top mounting plate 24. Additionally, the weight of the top mounting plate 24 compresses each of the wire rope isolators 120, as shown in FIG. 2.

Figure 4:
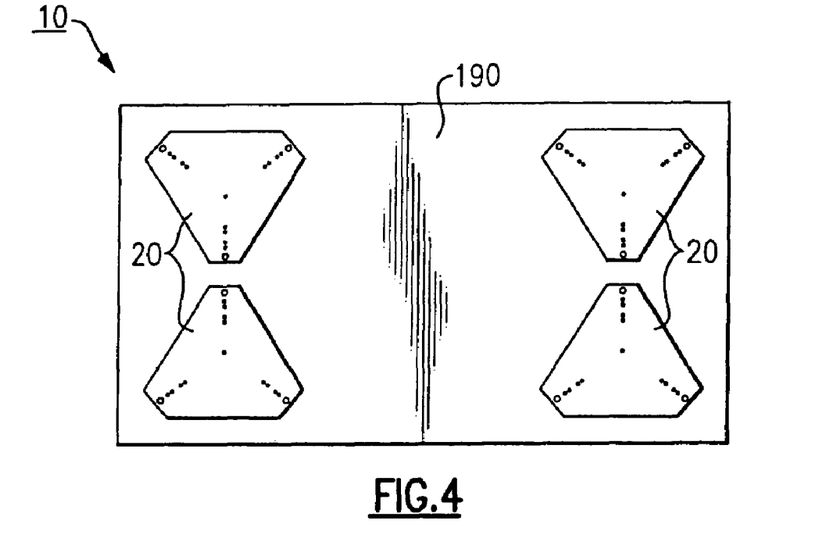
FIG. 4 is a top view illustrating a system arrangement of a plurality of the load multi-axial isolation assemblies of FIGS. 1-3(f) as used with a component.
Figure 5:
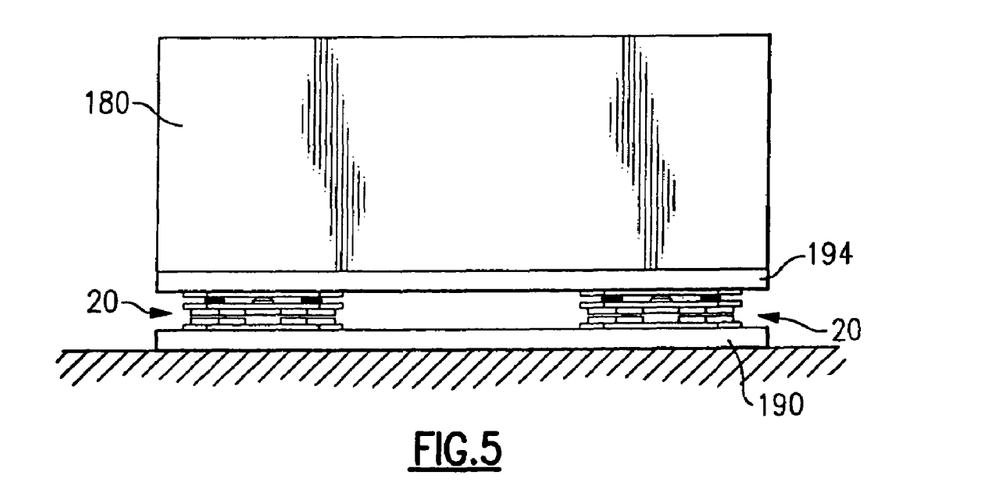
FIG. 5 is a side view, taken in elevation, of the multi-axial isolation system of FIG. 4.

One specific use employing the herein described isolation system 10 is illustrated in FIGS. 4 and 5 for isolating a component 180. For purposes of the discussion that follows, the component 180 is a chiller assembly that weighs approximately 14,000 pounds, the chiller assembly including a pair of skid plates beneath the component in the form of an upper skid plate 194 and a lower skid plate 190, respectively. A plurality of the herein isolation assemblies 20 are disposed between the upper and lower skid plates 194, 190. The lower skid plate 190 is secured to a fixed support, shown as ground in FIG. 5, in some conventional manner while the upper skid plate 194 is structurally attached to the bottom of the chiller assembly 180 in a conventional manner. In this particular instance, four (4) isolation assemblies 20 are provided, each of the assemblies being secured to this component by sandwiching same between the lower and upper skid plates 190, 194, thereby structurally interconnecting each isolation assembly 20 to this component 180.

In terms of the supporting and isolation method defined herein, four (4) isolation assemblies 20 are positioned in a distributed manner so as to support the component 180 at each corner thereof. The isolation assemblies 20 are further aligned relative to one another such that the corners 36, 40, 44 of each of the assemblies are also aligned with one another on each side, as is clearly shown in FIG. 4. The top mounting plate 24 is attached to the upper skid plate 194 and the bottom-mounting plate 28 is attached to the lower skid plate 190 as shown in FIG. 5. Bolts or other fasteners (not shown) are used in each of the end openings 48 to structurally and fixedly interconnect the bottom mounting plate 28 and the lower skid plate 190 and the top mounting plate 24 and the upper skid plate 194, respectively, the bolts being held by a washer and nut combination (not shown).

In terms of overall isolation, the above described multi-axial isolation system 20 can be used to support and isolate a component 180, such as the above-described chiller assembly, from a number of different motions, such as those produced by seismic events, major wind storms and blast levels, among others. The herein described isolation system 10 is capable of isolating both horizontal and vertical inputs (e.g., seismic motion), from the attached component, as follows.

First, the friction device 80 between the bottom and intermediate plates 28, 32 aids to control any overall horizontal motion that would be imparted to the lower skid plate 190. As lateral motion is received, the loaded piston 84 provides a frictional force against the movement based on the friction between the piston 84 and the friction plate 90. Second, the ball bearings 68 in each of the ball and cone isolators 57 permit a large amount of unrestrained lateral movement under the imposition of lateral loads, while the combination of the wire rope isolators 120 and the elastomeric pad 112 create a bi-modal spring that allows vertical isolation along with a solid foundation for the component 180 to rest upon. Furthermore, the inherent hysteric friction provided within the wire coils 140 of each of the isolators 120 further aids to stabilize the vertical isolation with added damping. The over-travel ring 70 also acts to further limit the amount of overall lateral movement.

More particularly and by way of example, a seismic event, of reasonable magnitude, will cause relative motion between the lower and upper skid supporting structures 190, 194 and the herein described isolation system 10. In the horizontal direction, the low-damped ball and cone isolators 57 of each isolator assembly 20 will permit the ground below to move relative to the mass inertia of the component 180 disposed above the isolation assembly 20. This action results in the isolation and reduction of lateral accelerations imparted to the supported component 180 which is "managed" by the horizontal friction device 80.

In the vertical direction, each of the herein-described isolation assemblies 20 of the overall system 10 is designed with a dual stiffness spring-like assembly. First, the wire rope isolators 120 will carry a substantial amount of the imparted vertical load directly to the lower ball and cone isolation assemblies 57 positioned axially therebeneath. The remaining weight is carried by the secondary elastomeric isolator pad 112. The preceding results in a semi-ridged foundation for proper functional performance of the component 180, as mounted thereto, and allows for both downward and upward flexibility during a major seismic or other type of event.

It is preferred that the four (4) distributed isolation assemblies 20 be leveled prior to use thereof, though use of four assemblies in the manner herein described will have a tendency to self-level.

Though the above description has been tailored with respect to seismic isolation, it will be readily apparent that the occurrence of other events such as major wind (e.g., hurricanes/tornadoes) or blast events can suitably utilize the herein described system. Due to the possibility of updraft in the case of each of these types of events, it is preferable or recommended that exterior hold-down straps be utilized.

The present invention has been particularly shown and described with reference to the preferred mode as illustrated in the drawings. It will be understood by one skilled in the art that various changes and modifications in detail may be effected therein without departing from the spirit and scope of the present invention as defined by the following claims.

PARTS LIST FOR FIGS. 1-5

10 isolation system
20 isolation assembly
24 top mounting plate
28 bottom mounting plate
32 intermediate plate
33 top facing surface, intermediate plate
36 end corner
40 end corner
44 end corner
48 opening
53 top facing side, bottom mounting plate
55 bottom facing side, intermediate plate
57 ball and cone isolators
60 upper concave dish
64 lower concave dish
68 ball, hardened
70 over travel ring
72 upper frame portion
74 foam seal
76 lower frame portion
77 brush guard component
80 lateral friction device
81 spring pin
84 piston or plunger
88 disc springs
90 friction plate
92 upper compartment
96 housing
98 dowel pin
100 opening
104 mounting base
107 fasteners
112 elastomeric pad
116 top surface, mounting base
120 wire rope isolators
124 upper mounting block
128 lower mounting block
136 lateral holes
140 wire coils
150 openings
154 openings
180 component
190 lower skid plate
194 upper skid plate

We claim:

1. A structural isolation system for a component, said isolation system comprising at least one multi-axial isolation assembly secured to said component, said at least one multi-axial isolation assembly including:
   a first mounting plate;
   a second mounting plate parallel to the first mounting plate;
   an intermediate plate disposed between said first mounting plate and said second mounting plate;
   a first isolation subsystem including a plurality of ball in cone isolators disposed between the first mounting plate and said intermediate plate for isolating the component from lateral loads or motions, and means disposed between said first mounting plate and said intermediate plate for resisting the lateral movement of balls contained in the ball in cone isolators, said means including a lateral friction device disposed in substantially the center of said first isolation subsystem; and a second isolation subsystem disposed between the intermediate plate and the second mounting plate for isolating the component from vertical loads or motions.

2. A system as recited in claim 1, wherein each of said ball in cone isolators is disposed on an end corner of said first mounting plate.

3. A system as recited in claim 1, wherein said lateral friction device is disposed in the center of said first mounting plate, said friction device including a loaded piston member that is substantially vertically disposed.

4. A system as recited in claim 1, wherein said second isolation subsystem includes a plurality of vertical isolators.

5. A system as recited in claim 4, wherein each of said plurality of vertical isolators are attached to a corner of said second mounting plate.

6. A system as recited in claim 5, wherein each of said vertical isolators are attached to a respective corner of said intermediate plate and said second mounting plate.

7. A system as recited in claim 6, wherein each of said vertical isolators are axially disposed relative to each of said ball in cone isolators.

8. A system as recited in claim 4, wherein said vertical isolators are wire rope isolators.

9. A system as recited in claim 1, including a plurality of multi-axial isolation assemblies attachable to a component.

10. A multi-axial isolation assembly for a component, said isolation assembly comprising:
    a first mounting plate;
    a second mounting plate arranged in parallel relation to said first mounting plate;
    an intermediate plate disposed between said first and second mounting plates and attached to the second mounting plate;
    a first isolation subsystem including a plurality of ball in cone isolators disposed between said first mounting plate and said intermediate plate for permitting lateral isolation of forces or motions imparted to said first mounting plate and a device disposed between said first mounting plate and said intermediate plate and at the center of said subsystem to resist the lateral movement of balls of said ball in cone isolators; and
    a second isolation subsystem provided between said second mounting plate and said intermediate plate for providing vertical isolation relative to said component.

11. An isolation assembly as recited in claim 10, wherein said first isolation subsystem includes three ball in cone isolators in spaced relation.

12. An isolation assembly as recited in claim 11, wherein said first second and intermediate plates are substantially triangular in configuration.

13. An isolation assembly as recited in claim 11, wherein said second isolation subsystem includes three vertical isolators disposed in spaced relation between said intermediate plate and said second mounting plate.

14. An isolation assembly as recited in claim 13, wherein each of said vertical isolators are axially aligned vertically with said ball in cone isolators.

15. An isolation assembly as recited in claim 13, wherein each of said first, second and intermediate plates are substantially triangular in configuration.

16. An isolation assembly as recited in claim 10, wherein said friction device slides between said first mounting plate and said intermediate plate in the same plane as said ball in cone isolators, said friction device including a loaded piston which is attached to the intermediate plate and a friction plate which is attached to the first mounting plate.

17. An isolation assembly as recited in claim 16, including an elastomeric pad attached to a top surface of a mounting base, said elastomeric pad being sandwiched between the second mounting plate and the top surface of the mounting base.

18. An isolation assembly as recited in claim 10, wherein said second isolation subsystem includes at least one vertical isolator disposed between said intermediate plate and said second mounting plate.

19. An isolation assembly as recited in claim 18, including at least one elastomeric pad disposed between said intermediate plate and said second mounting plate, said at least one pad forming part of said second isolation subsystem as a bi-modal spring used with said plurality of vertical isolators.

20. An isolation assembly as recited in claim 19, wherein said at least one elastomeric pad is disposed at the center of said assembly.

21. An isolation assembly as recited in claim 18, wherein said at least one vertical isolator comprises a plurality of wire rope isolators.

22. An isolation assembly as recited in claim 10, including an annular ring disposed between said first mounting plate and said intermediate plate for preventing lateral overtravel.

23. An isolation assembly as recited in claim 22, including a brush guard component attachable to said annular ring, said brush guard component extending to said intermediate plate.

24. A method for manufacturing a load isolation assembly, said method including the steps of:
    connecting a first mounting plate to a fixed support;
    connecting a second mounting plate to a component, each of said first and second mounting plates being secured together by an intermediate plate disposed therebetween;
    disposing a first isolation subsystem between the first mounting plate and the intermediate plate to isolate lateral loads or motions from the component, said first isolation subsystem including a plurality of ball in cone isolators spaced from one another and means for resisting lateral movement of balls of said ball in cone isolators, said means including a lateral friction device disposed in substantially the center of said subsystem; and
    disposing a second isolation subsystem between the second mounting plate and the intermediate plate to isolate vertical loads or motions from the component.

25. A method as recited in claim 24, wherein said first mounting plate is a lower mounting plate and said second mounting plate is an upper mounting plate.

26. A method as recited in claim 24, wherein said second isolation subsystem comprises a plurality of vertical isolators spaced from one another.

27. A method as recited in claim 26, including the step of placing the ball in cone isolators in axial alignment with the vertical isolators.

28. A method for isolating a component from multi-axially applied loads or motions, said method comprising the steps of:
    isolating the component from laterally applied loads or motions; and
    isolating the component from vertically applied loads or motions wherein each of said isolating steps are performed using a single isolation assembly by fixedly attaching structurally interconnected parallel first and second mounting plates of said isolation assembly to the component, wherein the lateral isolation step is performed using a first isolation subsystem having a plurality of ball in cone isolators disposed between said first mounting plate and an intermediate plate disposed between said first and said second mounting plate and means also disposed between said first mounting plate and said intermediate plate for resisting lateral movement of balls contained within said ball in cone isolators, said means including a lateral friction device including a vertically disposed piston assembly disposed on a friction plate, said piston assembly containing a plurality of spring elements designed to create a pre-load and said vertical isolation step is performed using at least one second isolation subsystem, each of the isolation subsystems being integrated within said single isolation assembly.

* * * * *